Figure 1:
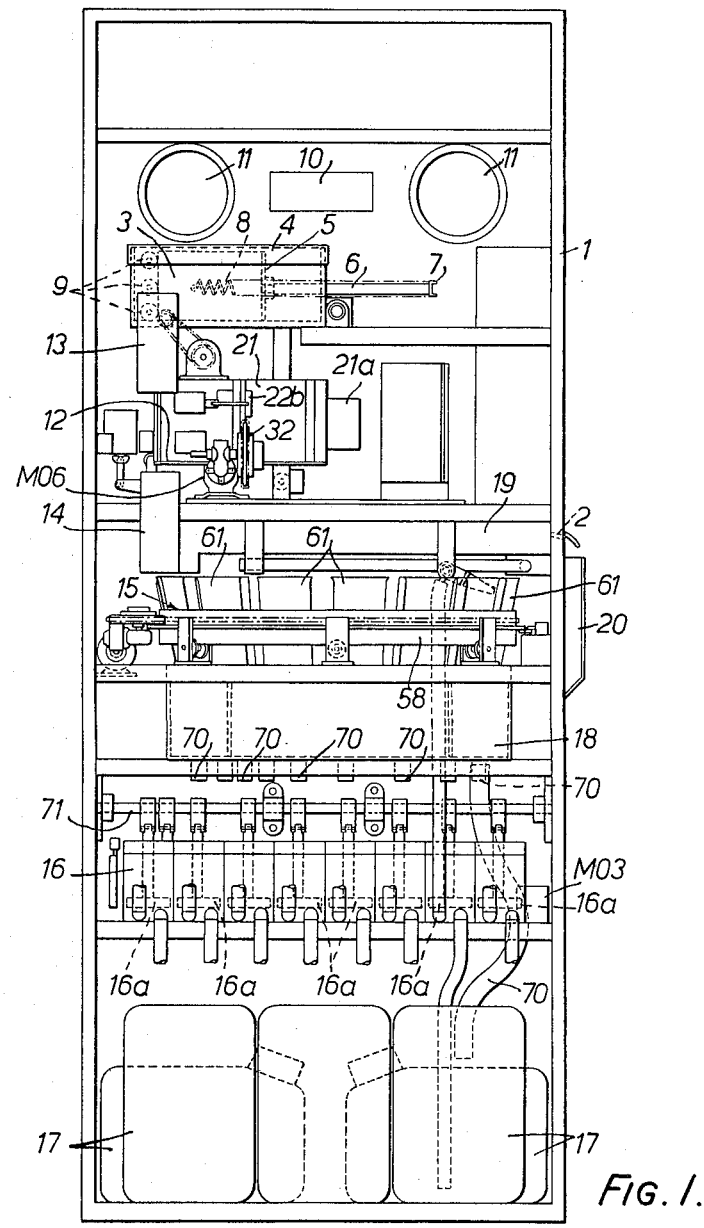

Jan. 25, 1966                 C. W. CLARK                  3,230,849
PHOTOGRAPHIC APPARATUS FOR PRODUCING MULTIPLE EXPOSURES
Filed Dec. 26, 1963                                    6 Sheets-Sheet 1

INVENTOR
CHARLES W. CLARK
BY
Watson, Cole, Grindle & Watson
ATTORNEYS

Jan. 25, 1966  C. W. CLARK  3,230,849
PHOTOGRAPHIC APPARATUS FOR PRODUCING MULTIPLE EXPOSURES
Filed Dec. 26, 1963  6 Sheets-Sheet 2

INVENTOR
CHARLES W. CLARK
BY
Watson, Cole, Grindle & Watson
ATTORNEYS

Jan. 25, 1966  C. W. CLARK  3,230,849
PHOTOGRAPHIC APPARATUS FOR PRODUCING MULTIPLE EXPOSURES
Filed Dec. 26, 1963  6 Sheets-Sheet 3

INVENTOR
CHARLES W. CLARK
BY
Watson, Cole, Grindle & Watson
ATTORNEYS

Jan. 25, 1966 C. W. CLARK 3,230,849
PHOTOGRAPHIC APPARATUS FOR PRODUCING MULTIPLE EXPOSURES
Filed Dec. 26, 1963 6 Sheets-Sheet 4
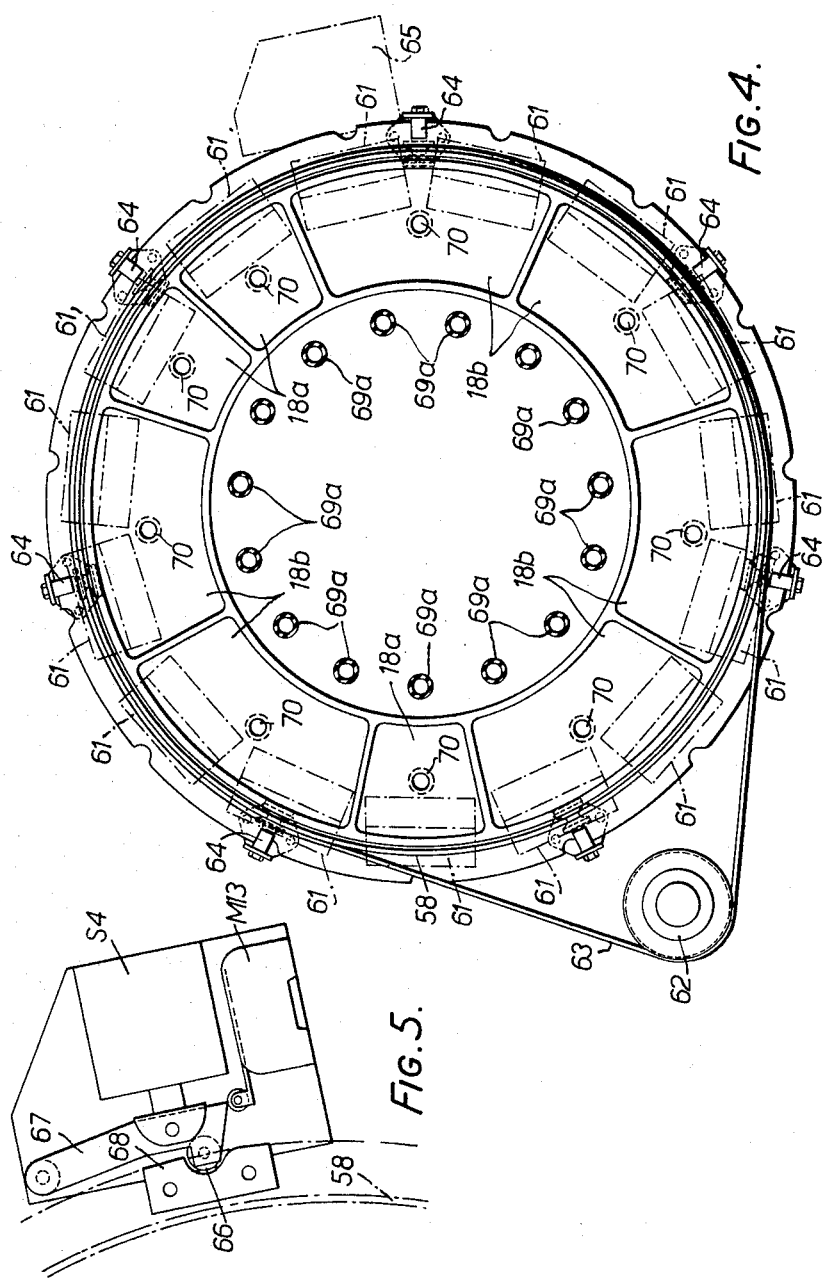
INVENTOR
CHARLES W. CLARK
BY
*Watson, Cole, Grindle & Watson*
ATTORNEYS Jan. 25, 1966  C. W. CLARK  3,230,849
PHOTOGRAPHIC APPARATUS FOR PRODUCING MULTIPLE EXPOSURES
Filed Dec. 26, 1963   6 Sheets-Sheet 5

INVENTOR
CHARLES W. CLARK
BY
Watson, Cole, Grindle & Watson
ATTORNEYS

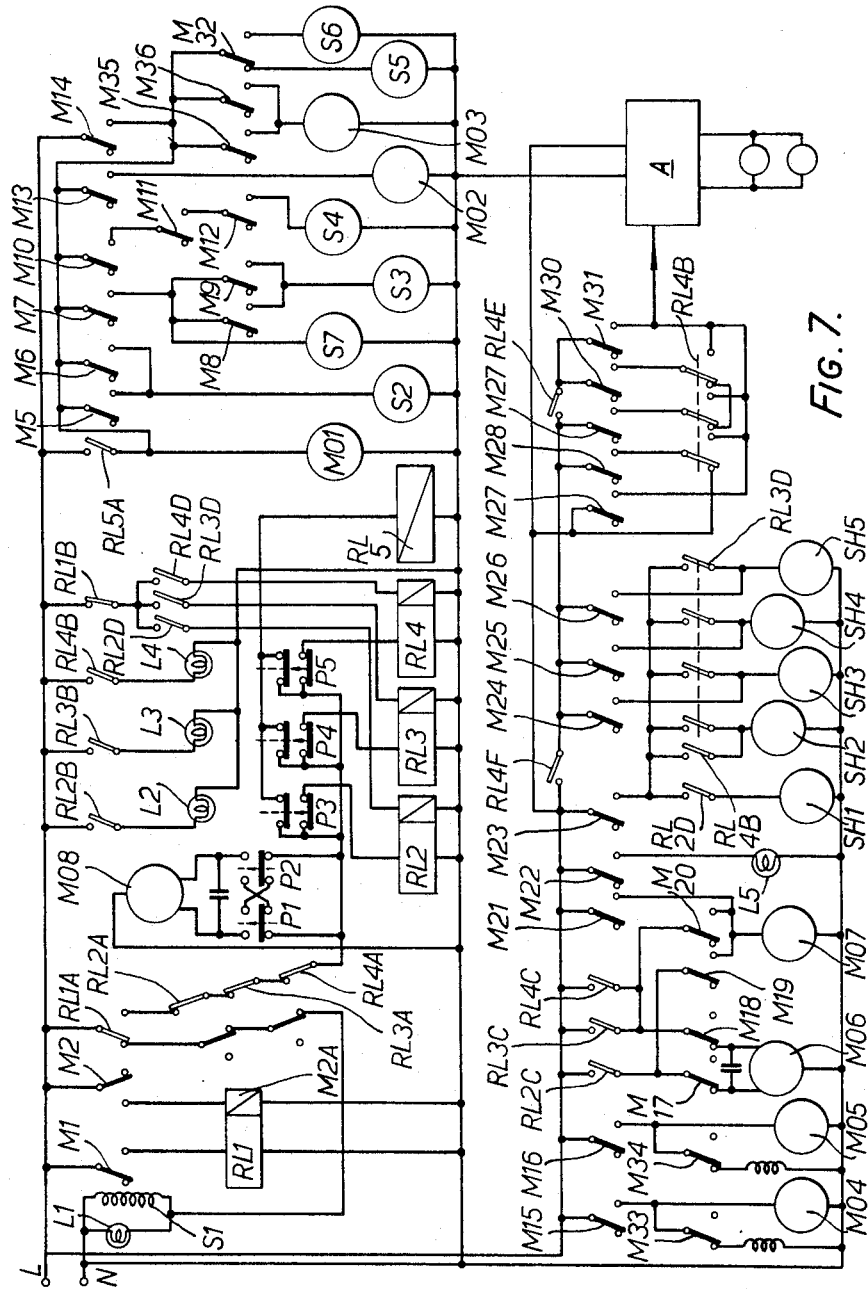

3,230,849
PHOTOGRAPHIC APPARATUS FOR PRODUCING MULTIPLE EXPOSURES
Charles William Clark, 24 Manchester Square, London W.1, England
Filed Dec. 26, 1963, Ser. No. 333,497
5 Claims. (Cl. 95—14)

This invention relates to photographic apparatus of the type in which an optical system is arranged to produce a photographic image or images on photosensitive sheet material arranged in an exposure position.

For convenience, the term "exposure" will be used hereinafter to describe the image of a subject recorded on the photosensitive material, and it will be assumed that the exposure is rectangular in shape, although it will be appreciated that it may be of other shape.

Further, the term "objective" will be used hereinafter to refer to a complete optical system comprising a lens or combination of lenses to produce the image of the subject, with or without one or more prisms, mirrors or the like arranged to produce the image at the desired position; and reference hereinafter to movement of the objective includes movement of a component of such an optical system, where such component movement produces the desired movement of the image.

It is an object of the present invention to provide improved photographic apparatus which will produce two or more exposures on different parts of a predetermined area of photosensitive sheet material and may have other advantages over existing forms of similar apparatus.

The invention is particularly applicable to the so-called "automatic" type of photographic apparatus, that is to say photographic apparatus which, upon actuation of initiating mechanism, for example by coin-freed or other manually operated or released mechanism, exposes photosensitive sheet material, submits the exposed material to a developing and fixing process and delivers the photograph or photographs thus produced.

According to one feature of the present invention, photographic apparatus includes supporting means arranged to locate and support a photosensitive sheet (hereinafter called a sensitised sheet) of predetermined area in an exposure position and objective means arranged to produce at least two images of a subject on different areas of the said sensitised sheet while so supported.

According to a further feature of the invention, the objective means may be so constructed and arranged that the two or more images can be produced substantially simultaneously or in succession.

According to a further feature of the invention the objective means may include in addition to the objective means by which the two or more images can be produced on the said different areas of the sensitised sheet, objective means by which when desired, a single image of a subject covering substantially the whole of the area of the photosensitive sheet can be produced thereon.

In any case, the photosensitive sheet material may be stored in the form of a stack of sensitised sheets, each of the predetermined area, and the photographic apparatus includes automatic means including feed mechanism arranged to bring a piece of material from the stack into an exposure position and means for moving the piece of material, after it has been exposed, from the exposure position to treatment apparatus in which development and fixing is effected.

Conveniently there is associated with the objective or each of a number of objectives constituting the objective means, a shutter having associated with it means whereby, after it has been opened, an exposure light source, for example, an electric flash, is automatically provided, following which the shutter is automatically closed.

As mentioned, the invention is particularly applicable to automatic apparatus. Thus in a preferred form, after an inititaing operation, such as the insertion of a coin to actuate a coin-operated device, the apparatus will perform the exposure operation, the feeding of the exposed sensitised sheet into processing apparatus, the processing and the feeding of the processed sheet out of the processing apparatus to a delivery point, as well as the feeding of an unexposed sensitised sheet into the exposure position automatically in the required sequence. The feeding of the unexposed sheet into the exposure position may be effected either at the end of the sequence, in readiness for the next exposure, or at the beginning of the sequence.

In addition, where as will usually be the case, the objective means includes means for producing either two or more images on different areas of a sensitised sheet or a single larger image covering substantially the whole of the area of the sensitised sheet selector means will be provided by which a subject can select which of these two alternative forms of exposure is desired. The selector means may also include means for selecting whether, in the case where two or more images are to be provided on different areas of the sensitised sheet, these areas will be exposed simultaneously, or in sequence with an interval between the individual exposures.

It will be understood that normally the total exposure area will be a multiple of the area of one of the smaller exposure areas where the objective apparatus can provide either one large or a number of small images, the preferred arrangement being one in which either a single large image, or four small images each covering one-quarter of the total exposure area, can be provided, each of the small images having a vertical dimension and a horizontal dimension which is respectively one half the vertical dimension and the horizontal dimension of the single large image.

Thus in one construction according to the invention the photographic apparatus comprises a camera and means by which on actuation of a coin freed or other initiating member, the apparatus automatically makes one or more exposures of a subject on a sensitised sheet and submits the exposed sensitised sheet to a developing and fixing process and delivers the photograph thus produced, wherein the apparatus includes selector mechanism by which the apparatus can be adjusted at will so that on actuation of the initiating member it either makes two or more exposures of the subject, each of relatively small size on different adjacent parts of the sensitised sheet or makes a single relatively large exposure of the subject covering substantially the whole area of the sensitised sheet, the arrangement preferably being such that, whereas for one setting of the selector mechanism the apparatus makes the single larger exposure, for another setting it makes four adjacent exposures of the subject each covering approximately one quarter of the total area exposed, the four exposures being arranged in two superimposed rows of two exposures each.

Figure 2:
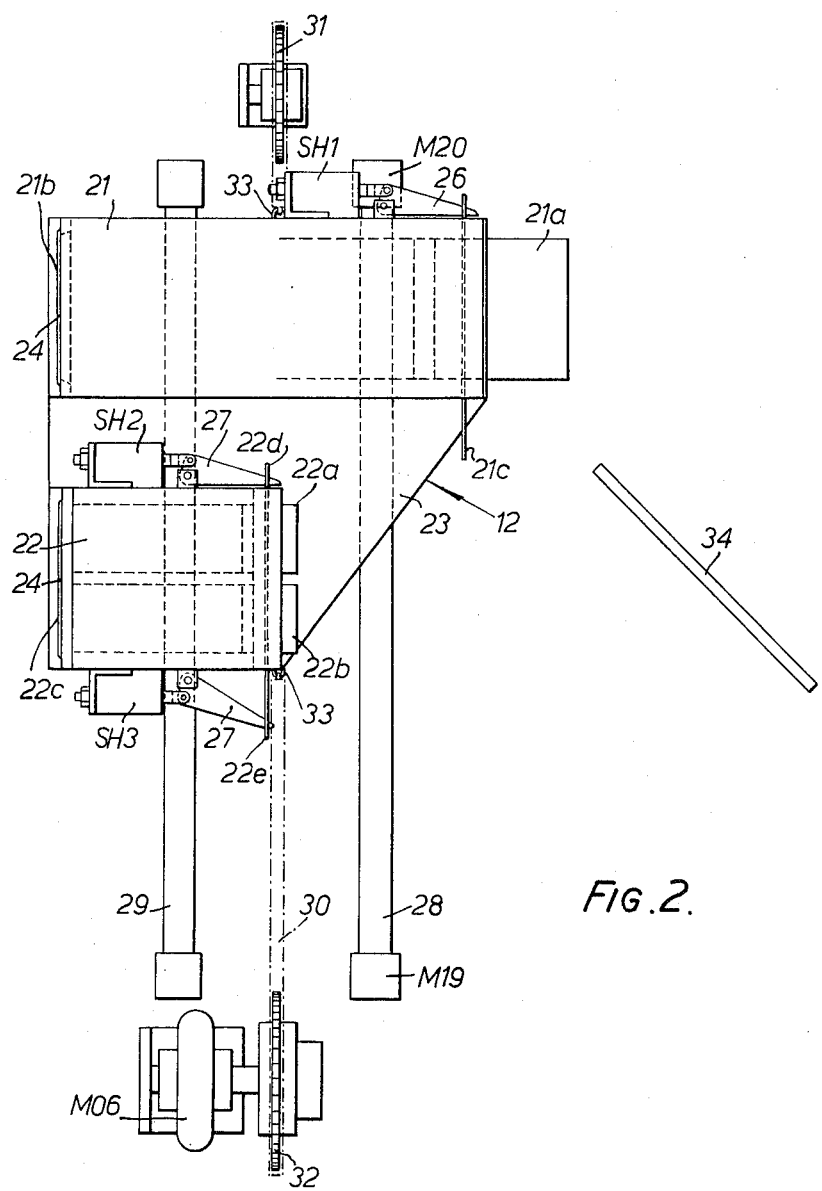
Figure 3:
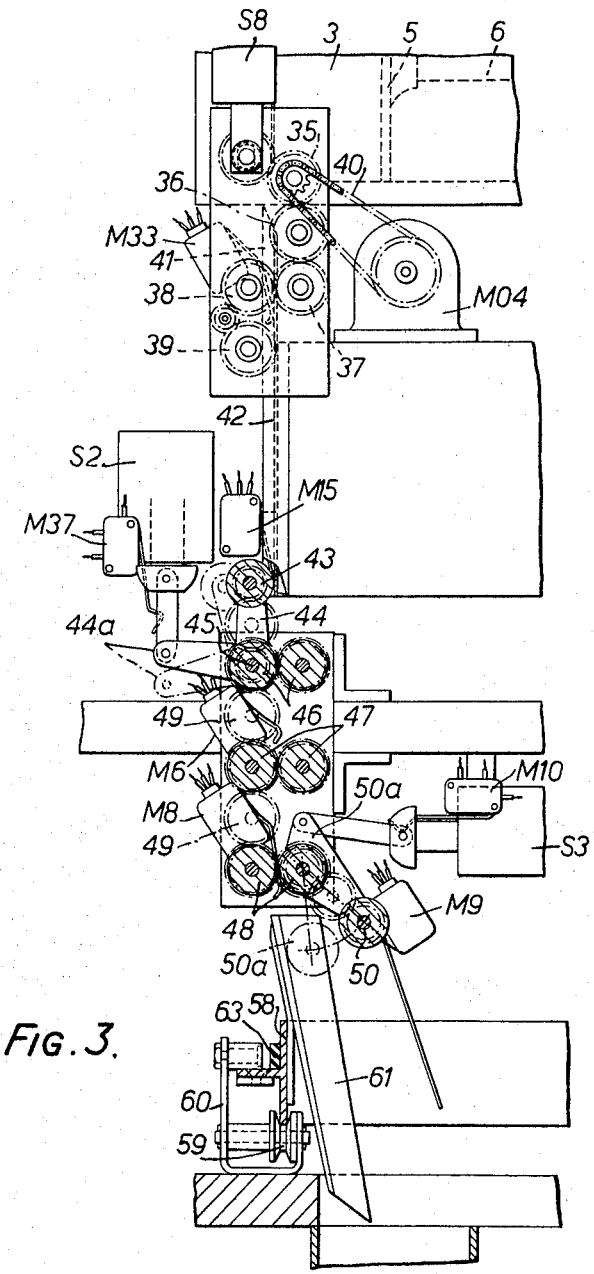
Figure 6:
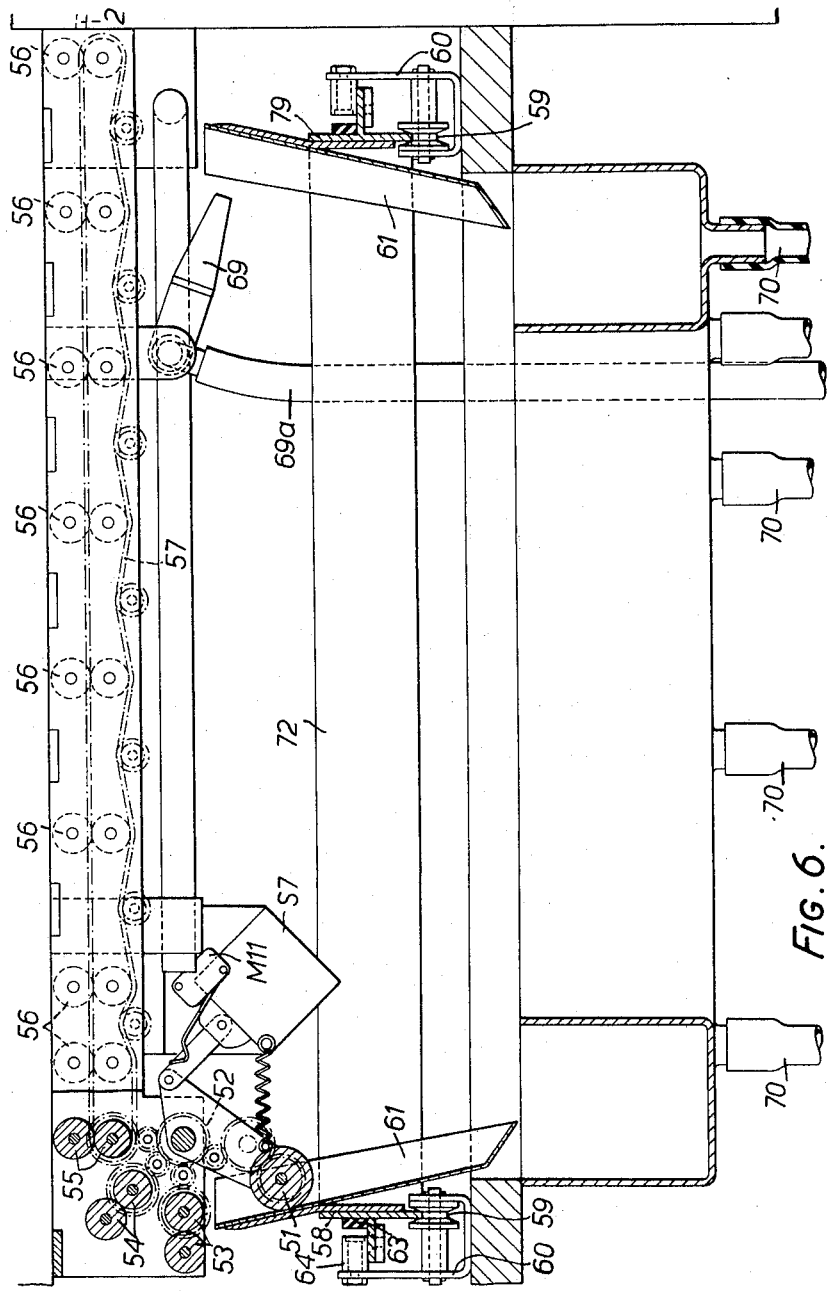

One construction of photographic apparatus according to the invention suitable for use by the public is shown by way of example in the accompanying drawings, in which FIGURE 1 is a somewhat diagrammatic side elevation showing the general arrangement of the complete photographic apparatus, FIGURE 2 is a plan view of the cameras and their associated selecting apparatus on an enlarged scale, FIGURE 3 is a side elevation, partly in section, showing the general arrangement of the apparatus for feeding the sensitised sheets into and from the exposure position and then into the processing apparatus, together with a part of such developing apparatus, FIGURE 4 is a plan view of the processing apparatus, FIGURE 5 is a plan view of a detail of the processing apparatus, FIGURE 6 is a side elevation, mainly in section, of the processing apparatus and the feed mechanism by which a sensitised sheet is fed into and removed from the processing apparatus, and FIGURE 7 is a diagram of the electrical circuits associated with the complete apparatus.

The photographic apparatus as shown in FIGURE 1 is contained within a vertical cabinet 1 within which the whole mechanism will in practice be enclosed but which in FIGURE 1 is shown with one wall removed for convenience. This cabinet will be disposed at one end of a larger cabinet the other end portion of which constitutes a compartment (hereinafter called the sitter's compartment) in which a subject to be photographed can sit, at least during the actual period of exposure of a sensitised sheet, following which the apparatus will automatically process the sensitised sheet and eventually discharge it through a delivery slot indicated at 2 as hereinafter more fully described.

As shown in FIGURE 1 the principal parts of the apparatus are arranged in the cabinet as follows:

Supported within the upper end portion of the cabinet is a magazine for a "stack" of unexposed sensitised sheets, in the form of a box 3 having a removable lid 4 and containing a pressure plate 5 mounted on the inner end of a sliding rod 6 the outer end of which carries a cross piece 7 the ends of which are acted upon by two tension springs as indicated at 8 whereby the pressure plate 5 is urged to the left in FIGURE 1. When the magazine is loaded it contains a stack of sensitised sheets on the righthand end of which the pressure plate acts so that the sheet at the lefthand end of the stack is pressed into engagement with three rollers indicated at 9. A rectangular inspection opening 10 covered with red glass or the like and circular apertures indicated at 11 in the wall of the cabinet will normally be closed by a locked panel or door which when opened permits access to the openings for the insertion through of a wrapped packet of sensitised sheets and of the hands of an attendant wearing light excluding "shrouds" on his arms, for unwrapping the packet, removing the lid 4, pressing back the plate 5 and insertion of the stack of sensitised sheets in the left hand end of the box 3, followed by release of the plate 5, replacement of the lid 4, withdrawal of the hands and wrapping and closing and relocking the panel.

Below the magazine 3, 4 is a compartment in which is disposed a camera assembly generally indicated at 12 in FIGURE 1 and arranged to receive sensitised sheets fed by feed mechanism, generally indicated at 13, from the lefthand end of the stack in the magazine and expose them in the manner hereinafter more fully described, while below the camera assembly is further feed mechanism indicated generally at 14 in FIGURE 1 by which the sensitised sheets, after exposure are fed downwards to processing apparatus generally indicated at 15 for developing and fixing the sensitised sheets, the processing liquids being fed to the processing apparatus by pumping apparatus, indicated generally at 16 from containers, generally shown at 17, to which containers the liquids in question return through receptacles indicated at 18 after passing through the processing apparatus 15 all in a manner hereinafter more fully described. Associated with the processing apparatus 15 is discharged feed mechanism indicated generally at 19 for delivering the exposed and processed sheets to and through the slot 2 into a receiving trough 20.

As shown more particularly in plan in FIGURE 2 the camera assembly 12 comprises two cameras 21 and 22 both carried by a common supporting plate 23, the camera 21 having a single objective 21a of such focal length as to produce upon a sensitised sheet lying against its rear wall 21b a single image covering the whole of the sensitised sheet while the camera 22 comprises four similar objectives, two of which 22a and 22b are shown in FIGURE 2, so disposed and of such focal length that they will produce upon a sensitised sheet lying against the rear wall 22c of the camera, four images each covering one quarter of the area of the sensitised sheet, the divisions between the images being represented by lines extending between the mid points of the four sides of the sheet at right angles to one another and parallel to the sides of the sheet. Each of the cameras 21 and 22 is provided adjacent to its rear wall with upper and lower slots as shown at 24 and 25 constituting entry and exit slots for the sensitive sheets to be exposed in the cameras.

Associated with the objective 21a is a shutter device 21c arranged to be operated by a lever 26 actuated by a solenoid SH1 while there are associated with the objectives 22a, 22b individual shutter devices, as shown at 22d and 22e for the objectives 22a and 22b, each arranged similarly to be actuated by a lever 27, the lever 27 being actuated by solenoids, identified for convenience respectively by the references SH2, SH3, SH4 and SH5 but two only, SH2 and SH3, are shown.

The complete camera assembly comprising the two cameras 21 and 22 and the base plate 23 is supported upon two parallel horizontal guides 28, 29 along which it can be caused to travel by traversing mechanism consisting of a chain 30 passing around sprockets 31 and 32 and connected at its ends at the points 33 to the camera assembly, this traversing mechanism being driven by a reversible electric motor indicated at MO6. The axes of the objectives 21a, 22a, 22b etc. lie parallel to the face of the cabinet 1 adjacent to the sitters compartment and arranged within the cabinet 1 is a mirror as indicated at 34 such that when the camera assembly is in the position shown in FIGURE 2, and assuming the appropriate shutters to be open an image of a sitter in the sitters compartment will be transmitted by way of the mirror 34 through each of the objectives 22a, 22b etc. on to a sensitised sheet situated at the back of the camera 22 while the camera assembly can be caused by the electric motor 33 to travel along the guides 28, 29 into an alternative position as hereinafter described so that the objective 21a will be opposite the mirror 24 and an image of the sitter will therefore be transmitted through the objective 21 on to a sheet of sensitized material at the back of the camera 21 assuming its shutter 21c to be open. The camera traversing motor MO6 is brought into and out of operation by traverse-initiating and limit switches as hereinafter more fully described.

When either of the cameras 21 or 22 occupies the position in which an image or images of a sitter will be transmitted by way of the mirror 34 through its associated objective or objectives, the camera also lies immediately below the rear part of the magazine 3 so that a sheet of sensitised material can be fed from the magazine by the feed mechanism 13 through the appropriate upper slot 24 or 25 into the exposure position within the camera.

As shown more particularly in FIGURE 3, this feed mechanism comprises for each camera a series of rollers 35, 36, 37, 38, 39, 41 all interconnected by gearing in the manner indicated in FIGURE 3 and arranged to be driven by chain gearing 40 from an electric motor; the electric motors associated respectievly with the cameras 21 and 22 being identified respectively by MO4 and MO5 of which MO4 is shown in FIGURE 3.

The roller 35 of each feed mechanism is connected to its shaft by an electro-magnetic clutch as hereinafter described and has a surface such as to grip the rearmost sensitised sheet in the stack in the magazine 3 and when rotated to feed it downwards into the upper end of a polished trough-like guide indicated at 41 where it first comes into contact with the roller 36 which rotates in the opposite direction from the roller 35 so as to tend to resist downward movement of the sheet. The roller 36 has a surface, however, which will grip the sheet with substantially less friction than the roller 35 so that if a single sheet is fed downwards it will continue its travel down the guide 41 until it is gripped between the rollers 37 and 38 to be fed on downwards until gripped between the roller 39 and the edge portions of polished guides indicated at 42 within the back of the camera and thus delivered into the exposure position within the camera. The roller 36 is thus ineffective provided only a single sheet is fed from the magazine 3, but if two sheets are so fed the righthand one of the two sheets will not be directly gripped by the roller 35 and the roller 36 will therefore prevent its being fed down along the guide 41. The feeding of two sheets into the camera is thus prevented while moreover the second sheet is nevertheless left in a position in which on the next operation of the feed mechanism it will be fed into the camera.

Disposed at an appropriate point adjacent to the back of each magazine is a microswitch M3 for magazine 3 and M4 for magazine 4 so that when the stock of sensitised sheet in the magazine falls below a predetermined minimum quantity a warning lamp illuminates and an electrical interlock operates so that the machine cannot be operated.

The apparatus for feeding a sensitised sheet which has been exposed in either camera from the exposure position downwards to the treatment apparatus comprises a first roller 43 having a rubber or like surface providing adequate friction and mounted upon an arm 44 pivotally supported at 45 and arranged to be moved angularly from the position 44a shown in chain line to the position shown in full line by means of a solenoid S2 having associated with it a micro-switch M37 to prevent the operation of the camera traverse when in the inoperative condition. Further pairs of rollers 46, 47, 48 geared to one another by gearing indicated at 49 and driven by a motor MO1 (not shown) are arranged as shown below the roller 43 for the purpose of feeding downwards a sheet of exposed sensitised material delivered to the uppermost pair 46 by the roller 43 the pairs of rollers 47 and 48 having associated therewith a microswitch M6 the control member of which lies in the path of the sheet of sensitised material, to sense when an exposed sensitised sheet has left the camera. The solenoid S2 is operated to bring the roller 43 into the position shown in full lines at a determined point in the cycle of operations as hereinafter more fully described.

As a sensitised sheet passes downwards from the rollers 48 it enters an appropriate one of a series of trough-like carriers forming part of the processing apparatus as hereinafter more fully described and is then fed downwards into position in such carrier by a roller 50 which is carried by an arm 50a and is driven from the rollers 48 and for this purpose is moved from the position shown in full line into the position shown at 50a in chain line by means of a solenoid.

At this point it may be convenient to refer to the fact that whereas the rollers 43, 46, 47, 48, 50 are situated when viewed in plan, at one angular poistion about the axis of rotation of the carriers as hereinafter described, there is provided at an adjacent angular position a somewhat similar mechanism as shown in FIGURE 6 comprising a roller 51 mounted upon a pivoted arm 52 under the control of a solenoid S7 with an associated microswitch M11, pairs of rollers 53, 54 and 55 arranged to receive, grip and feed between them a sheet of sensitised material fed upwards by the roller 50 by the roller 64 and to transfer that sheet of sensitised material to conveying apparatus consisting of a further series of rollers indicated at 56 driven by a chain 57 to convey the sheet of material across the cabinet and out through the slot 2. The feed rollers referred to above, are all driven by an electric motor (not shown) identified as MO1.

The processing apparatus, as shown more particularly in FIGURES 4, 5 and 6, comprises an annular support 58 mounted to rotate about a vertical axis on a series of supporting rollers 59 carried by brackets 60 from a support 58 within the cabinet 1, the rotary support 58 the series of carriers 61 evenly angularly spaced around it and of trough-like form as shown more particularly in FIGURE 6. Each of the carriers 61 is formed to support a sensitised sheet against its outer wall and after a sensitised sheet has been delivered to one of the carriers 1 in the manner generally indicated above the support 58 is rotated step by step, in such manner that each of the carriers 61 occupies the same position in turn, by apparatus comprising an electric motor MO2 arranged to drive continuously a pulley 62 round which passes a frictional belt 63 also passing round rotatable support 58 so that torque tending to rotate the support 58 is applied continuously to it when the motor MO2 is in operation. A series of rollers 64 serve to prevent upward movement of the support 58 from the rollers 59. Associated with and controlling the movement of the rotatable support 58 is indexing mechanism shown more particulraly in FIGURE 5 and indicated at 65 on FIGURE 4, this indexing mechanism comprising a roller 66 supported upon a pivoted arm 67 arranged to be actuated by a solenoid S4 having a switch M13 operated thereby, the roller 66 being arranged to engage a recess in each of a number of circumferentially spaced plates 68 whose circumferential spacing is the same as the circumferential spacing of the carriers 61.

The control of the solenoid S4 to effect the required step by step movement of the rotary support and the necessary length of pause between each step and the next is effected in a manner hereinafter more fully described but it will be apparent from the above description and FIGURES 4 and 5 that this control can be effected by suitable timed energisation and de-energisation of the solenoid S4.

Disposed below the rotatable support 58 is a collecting device comprising the receptacles generally indicated at 18 in FIGURE 1 some of which 18a have a circumferential width equivalent to that of one only of the carriers 61 while others, 18b are of a circumferential width equivalent to two of the carriers 61 as will be clear from FIGURE 4. Associated with these receptacles are spray nozzles, one of which is indicated at 69 in FIGURE 6 arranged to be fed by pipes 69a from the pump apparatus 16 and to direct jets of treatment liquid into the carrier 61 which at any moment lie opposite to them. Each of the nozzles 68, has treatment liquid delivered to it by one of a series of reciprocating pumps the plungers of which are indicated at 16a in FIGURE 1 arranged to draw liquid from one or other of a number of the containers 17 to which the liquid thus delivered returns, after flowing down over the inside of the carrier 61, by a pipe 70. For convenience only the upper ends of some of the pipes 70 are shown in FIGURE 1. During each period of pause of the rotary support 58, the pistons of the pumps are all caused to perform a delivery stroke by the rocking of an operating shaft 71 by a motor MO3. Thus as the support 58 is moved round step by step, treatment liquid in measured quantities is delivered through all the nozzles 68 into the trough-like carriers 61 during each period of pause and flows down the inner surface of the carriers or of any sensitised sheet supported thereby into the appropriate receptacle 18a or 18b and hence back to the container 17 from which it came through the pipes 70.

The reason for the different circumferential widths of the different collecting members is that at certain stages in the total processing it is desirable or convenient to treat a sensitised sheet with the same treatment liquid for twice the period of its treatment with other treatment liquids. Moreover the treatment liquids include water to which the surface of each sensitised sheet is subject between successive treatments with other liquids so as to tend to prevent one treatment liquid becoming contaminated with another, e.g., a developing liquid with a fixed liquid.

The general operation of the apparatus and the function of certain elements not hitherto referred to will now be described with particular reference to FIGURE 7 of the drawings which is a wiring diagram showing the arrangement of relays, switches, electric motors, and solenoids, etc., by which the operation of the whole apparatus is effected and controlled.

In FIGURE 7 of the drawings the various contacts of a relay are identified by the same main reference letters and numeral, e.g., RL1, RL2, etc., with the addition of a reference letter to identify the particular contacts, e.g., RL1a, RL1b, RL2a, RL2b, etc., RL1a and RL1b being contacts operated by the relay RL1 while RL2a and RL2b are contacts operated by the relay RL2.

In FIGURE 7 L1 is a green light visible to the occupant of the sitter's compartment, L2 is a light indicating that a push button switch P3 has been pressed into an operative position;

L3 is a light indicating that a push button switch P4 has been pressed into an operative position;

L4 is a light indicating that a push button switch P5 has been pressed into an operative position;

L5 is a red light indicating that an exposure is about to take place;

P1 and P2 are push button switches provided in case it may be desired to have electric raising and lowering mechanism for the seat on which the occupant of the sitter's compartment sits, P1 being the seat raising switch and P2 the lowering switch;

P3, P4 and P5 are three selector switches, P3 being operated if one large photograph is required, P4 being operated if four small similar photographs taken simultaneously are required, while P5 is operated if four small photographs are to be taken in sequence on the sensitised sheet with an interval between the exposures so that the four photographs may be different;

RL1, RL2, RL3 and RL4 are latch-in relays;

RL5 is a time delay relay set to open approximately three minutes after closing;

MO1 is the motor driving the feed rollers as above mentioned.

MO2 is the motor which drives the shaft 62 for the treatment apparatus in FIGURE 4 as mentioned above.

MO3 is the motor which operates the pumps 16 in FIGURE 1 as also mentioned above.

MO4 and MO5 are the motors for the feed mechanism for delivering sensitised sheets respectively to the two cameras as previously mentioned.

MO6 is the motor for traversing the cameras shown in FIGURES 1 and 2.

MO7 is a motor which drives a timing cam mechanism of known type for causing a sequence of operations as hereinafter described;

MO8 is the motor which may be employed to raise and lower the seat as above mentioned;

S1 is a solenoid associated with coin operated mechanism;

S2 and S3 are solenoids shown in FIGURE 3;

S4 is a solenoid 82 shown in FIGURE 5;

S5 and S6 are solenoids which may be provided, but are not employed in the mechanism shown, to operate electromechanically the valves of the pumps 16, which in the construction shown are assumed to be automatic valves.

S7 is the solenoid associated with the roller 51 shown in FIGURE 6.

SH1 is the solenoid shown in FIGURE 2;

SH2, SH3, SH4 and SH5 are the four solenoids of which SH2 and SH3 are shown in FIGURE 2, which operate respectively the four shutters for the four objectives of the camera 22.

M1 is a coin-operated micro-switch;

M2 is a micro-switch which switches out the motor MO7 when a sequence of operations is completed;

M3 and M4 are micro-switches associated with the two cameras as above mentioned to indicate when a sensitised sheet is present in a camera.

M5 is a micro-switch which operates when the motor MO7 has nearly completed its operation;

M6 is the micro-switch shown in FIGURE 3 to cut supply to S2.

M7 is a switch operated when the rotary support 58 is in position for a carrier 61 to receive an exposed sensitised sheet;

M8 is a micro-switch shown in FIGURE 3 indicating that the paper is arriving at a carrier 61;

M9 is the micro-switch shown in FIGURE 3 which indicates that the paper has entered a carrier;

M10 is the micro-switch shown in FIGURE 3 serving to indicate that the lever is in the position shown in FIGURE 3 and therefore clear of the carriers 61;

M11 is the corresponding micro-switch shown in FIGFURE 6 indicating that the lever 51a carrying the feedout roller 51 from the carriers is in a corresponding position permitting movement of the carriers.

M12 is a switch indicating that the pumps 16 have completed their exhaust stroke;

M13 is the switch shown in FIGURE 5;

M14 is a switch carrying the return of the pumps 16 to their exhaust position;

M15 is a switch indicating that a sensitised sheet is required in camera 21;

M16 is a switch indicating that a sensitised sheet is required in camera 22;

M17 and M18 are switches which operate to bring the cameras into the required positions for exposure.

M19 and M20 are switches which are operated when the cameras reach the desired positions;

M21 is a switch which returns the timing motor MO7 to the beginning of a sequence;

M22 is a switch operating a red light from the timing apparatus to indicate when exposures are about to take place;

M23, M24, M25 and M26 are switches which operate to provide a sequence of four exposures in camera 22 when required;

M27 is a switch controlling solenoid SH1 for opening the shutter 21c of camera 21.

M28, M29, M30 and M31 are switches controlling respectively the solenoids SH2, SH3, SH4 and SH5 for opening the respective shutters on camera 22;

M32 is a switch which may be used to open and close the pump valves but is not used in the apparatus as shown;

M33 and M34 are switches which may be provided to indicate when a sensitised sheet is clear of the roller 39 of camera 21 and camera 22 respectively but are not provided in the apparatus shown;

M35 is a switch which closes when a carrier 61 is in position to receive a sensitised sheet;

M36 is a switch which causes the pumps to perform their suction strokes.

In FIGURE 7 the circuit is shown in its dormant condition that is to say the condition prior to the insertion of a coin to set the whole apparatus into operation. The operation is as follows:

The relay RL1 through its contacts RL1A is normally energising the green light L1 and the solenoid S1 which when energised allows a coin to enter through a coin slot in conventional manner, provided that the micro-switches M3 and M4 are in the positions they occupy when a sensitised sheet is in each of the cameras. When a coin is inserted it operates the switch M1 so as to energize relay RL1 which, through its contacts RL1A disconnects the green light L1 and, through contacts RL2A, RL3A and RL4A of relays RL2, RL3 and RL4 supplies current to the push-button switches P1, P2, P3, P4 and P5. Push-button switches P1 and P2 are therefore now operable to cause operation of the motor MO8 in one direction or the other to raise or lower the seat while push-button switches P3, P4 and P5 are operable to select whether the apparatus is to take one large photograph by means of the camera 21 or four substantially identical simultaneous photographs by means of the camera 22 or four photographs in succession by means of the camera 22.

The push-button switches P3, P4 and P5 are interlocked in known manner to allow only one of the buttons to be selected and pushed at a time. According to the selection made relay RL2, RL3, or RL4 will be energised and through the contacts RL2A, RL3A or RL4A will disconnect the current supply from all five of the push-button switches P1, P2, P3, P4 and P5.

Operation of any one of the push-buttons P3, P4, P5 will operate relay RL5 which is a time delay relay which after such energisation remains operative for approximately three minutes before automatically becoming inoperative. The relay RL5 through the contacts RL5A brings into operation the motor MO1 which is the motor driving the rollers by which the sensitised sheet is carried first from the camera 21 or 22 to the appropriate carrier 61 of the treatment apparatus and subsequently from that carrier to the delivery slot 2. The processing and delivery of the exposed sensitised sheet is completed in less than three minutes as hereinafter explained, whereupon the relay RL5 becomes inoperative and the motor MO1 is therefore shut off.

Assuming that the push-button switch P3 is selected by the sitter, who therefore desires one large photograph, thus energising relay RL2, this relay then latches in and by its contacts RL2B illuminates lamp L2 showing that the selection has been properly effective, while at the same time, through its contacts RL2C and contacts M17 bringing into operation the motor MO6. This motor traverses camera 21 into the exposure position and at the end of its travel a microswitch M17 (not shown in FIGURE 2) is actuated by the camera assembly to stop the motor MO6. When the camera 21 has reached the appropriate position it also operates microswitch M19 to bring the motor MO7 into operation. The motor MO7 as mentioned is a timer motor driving cam mechanism of known type which operates a series of switches in a predetermined sequence as follows:

Firstly it closes switch M22 causing the lamp L5 to be illuminated thus indicating that an exposure is about to be made, it then operates switch M23 so as to open the shutter 21C of camera 21 by way of the contacts RL2D. When the shutter of camera 21 opens it operates switch M27 (not shown in FIGURE 2) which sends an impulse to a flash unit shown at A, thus causing an exposure flash to occur in the sitters compartment and thus effect an exposure on the sensitised sheet in camera 21. As the motor MO7 continues to operate its opens the switches M22 and M23 so that the lamp L5 is switched off and the shutter 21C closes, and the motor MO7 then continues to operate until towards the end of the cycle it operates the contacts M2 which energise the unlatching mechanism M2A of relay RL1 which in turn unlatches the latching mechanism RL2C of relay RL2 so that relay RL2 opens. The motor MO7 then continues to rotate for a short period until it reaches the start position when the operation of the switch M21 stops it.

During the period since the exposure the exposed sensitised sheet is being fed from the camera 21 down into the treatment apparatus 15 in a manner hereinafter described.

Assuming that press-button switch P4 is operated by a sitter this energises relay RL3 which latches in and, through contacts RL3B illuminates lamp L3 showing that the selection has been correctly made. At the same time, through the contacts RL3C, it brings into operation the motor MO6 in the opposite direction from its operation when the relay RL2 is energised. The camera assembly is therefore moved into its other position, that is to say the position in which the camera 22 is in position for making four exposures, the movement of the camera assembly being arrested by a microswitch M18 (not shown in FIGURE 2), when the camera assembly reaches the end of its travel in the appropriate direction. When the camera 22 reaches this position the switch M20 is operated, thus bringing into operation the timer motor MO7, whereupon the same sequence as that described above is followed, except that, when the switch M23 is operated, all four shutters of the camera 22 are opened simultaneously by way of the set of contacts RL3A. The operation of the four shutters respectively operate the microswitches M28, M29, M30 and M31 which are at present in series thus passing an impulse to the flash unit A to cause a single exposure flash. After the exposure thus effected the sequence of operation continues as in the manner above described for exposure in the camera 21.

Assuming that the press-button switch P5 is operated by a sitter, thus energizing relay RL4 this relay then latches in and through contacts RL4B illuminates light L4 showing that the selection has been effective. As in the case where push-button switch P4 is pressed as described above, camera 22 is then moved into exposure position and when in such position brings into operation the timing motor MO7 after which switch M22 is operated and then switch M23 to cause operation of solenoid SH2. Since relay RL4 is at this time energised, the switches M28, M29, M30 and M31 now operate the flash apparatus A individually so that when shutter SH2 is opened M28 is closed to operate the flash device, after which the motor MO7 continues to rotate and closes the switch M24 causing the shutter SH3 to open and the flash apparatus to be again operated. The switch M22 is then again closed to open shutter SH4 and the flash apparatus is operated and finally is closed again to operate the shutter SH5 and effect the operation of the flash apparatus A. As before the timing motor MO7 continues until the switch M2 is operated at the termination of the sequence.

Whichever of the two cameras has been used for an exposure or exposures the processing apparatus operates as follows.

The operation of any one of the press-button switches P3, P4 or P5 energises the relay RL5 as mentioned and thus, through the contacts RL5A causes operation of the motor MO1 driving the rollers of the feed mechanism 14, and the pumps 16, the pumps 16 having been left at the beginning of their suction cycle by the switch M14 when the relay RL5 previously became de-energised. The motor MO3 therefore begins to rotate by way of the contacts M36 and the pumps start charging themselves. At this point solenoid S4 will be energised by the operation of the contacts M12 (M10 and M11 being already operated since the feeding rollers 61 should be clear of the carrier adjacent to them) and, as solenoid S4 is energised it pulls the locking roller 66 clear of its associated recessed plate 68 and this operates switch M13. This starts up the motor MO2 so as to rotate the carrier support 58 whereupon M12 is switched off but the locking roller 66 cannot return to its locking position until the carrier reaches the next position i.e. until the roller 66 comes into engagement with the recess in the next plate 68. When this happens the locking plate opens the switch M13 and thus stops the motor MO2. The pumps in the meanwhile continue on their intake operation until completed and when switch M35 is operated indicating that a carrier support is in the next position, the pumps effect their delivery strokes and the appropriate treatment liquids are therefore discharged into the carriers in the manner referred to above. When the timer motor MO7 is nearing completion of its cycle the switch M5 is operated thus energizing solenoid S2 which brings into operation the feed roller 43. The exposed sensitised sheet is therefore immediately fed down towards the appropriate carrier 61 switch M6 is operated by the sensitised sheet and ensures that it is taken clear of the camera while switch M15 or M16 senses that a film is no longer in its respective camera and brings into operation motor MO4 or MO5 to feed a new sheet of sensitised material from the magazine into the camera from which the exposed sensitised sheet has been removed for processing. Switches M33 and M34 serve to render the uppermost rollers 35 inoperative, e.g. electromagnetically to ensure that more than one sensitised sheet is not fed down at a time.

When the pumps 16 are performing their delivery strokes, the switch M7 is operated to bring into operation the solenoid S7 and thus cause removal from the carrier 61 adjacent the roller 51 of an exposed and processed sensitised sheet if one should be present in that carrier. Switch M7 also operates solenoid S3 by way of the switch M8, which has already been operated by reason of the sensitised sheet passing down from the camera, and the sheet is thus taken into the carrier 61 immediately below it. The switch M9 overrides the switch M8 and thus ensures that the sensitised sheet is fed down to the bottom of the carrier before the solenoid S3 is de-energised.

When the pumps 16 have completed their delivery strokes the carrier support 58 will again be moved on a further step. Thus the exposed sheet passes through the various stages of processing until the processed sheet is brought beneath the roller 51 for removal and delivery to and through the slot 2.

What I claim as my invention and desire to secure by Letters Patent is:

1. Automatic photographic apparatus including in combination a cabinet, magazine means within the upper part of the cabinet comprising a rectangular housing to receive a stack of rectangular sensitized sheets and including an end wall having an exit slot adjacent to its lower edge, a pressure plate disposed to act on one end of the stack of sheets to press the sheet at the other end of the stack against said end wall and spring means acting on said pressure plate, first roller feed means disposed adjacent to said slot to act on the lower edge portion of the sheet at the adjacent end of said stack and feed said sheet downwards, a camera assembly disposed below said first feed means and including two cameras disposed side by side and rigidly connected to one another, each of said cameras including upper and lower slots respectively for the entry into an exposure position adjacent to one end of said camera a sensitised sheet delivered by said first feed means and exit of said sheet, one of said cameras including a single objective providing an image on a sensitised sheet when in said exposure position, of substantially the area of said sensitized sheet while the other camera includes four objectives disposed to transmit onto the sensitised sheet in its associated exposure position four different rectangular images each of approximately one-quarter of the area of said sensitised sheet, selection means and traversing means for moving said camera assembly horizontally in a direction at right angles to the axes of said objectives to bring one of said cameras or the other alternatively into an operative position, second roller feed means disposed below the camera at the moment in said operative position to withdraw an exposed sensitised sheet through the lower slot in said camera and feed said sensitised sheet downwards, processing apparatus disposed below said second roller feed means and comprising a rotary carrier support rotatable about a vertical axis, a series of carriers equally angularly displaced on said support about said axis and each formed to receive a sensitised sheet fed down by said second feed means when in position below said second feed means and to support said sensitized sheet in an inclined position, means for rotating said carrier support step by step to bring each of said carriers successively into each of a series of stations, nozzle means adjacent to said stations to deliver processing liquids towards sensitized sheets supported by said carriers, reservoirs for said processing liquids, delivery means for delivering said liquid from each of said reservoir means to an associated one of said nozzle means, receptacles below said carriers including a receptacle adjacent to each of said nozzle means to receive the processing liquid delivered by said nozzle means and return said liquid to the respective reservoir, means for actuating said delivery means during the stationary periods between step by step movements of said carrier support, and third roller delivery means angularly displaced about the said axis of rotation of said carrier support from said second roller delivery means and situated above said carriers to withdraw from the said carriers occupying a position below it a processed sensitized sheet upwardly and deliver said sheets to an exit point in said cabinet.

2. Automatic photographic apparatus as claimed in claim 1 including manually operable selector means whereby said camera assembly is caused to traverse to bring one or other of said cameras into said operative positions, shutter apparatus associated with the objectives of said cameras and apparatus which automatically actuates the shutter mechanism of whichever of said cameras is in said operative position for exposure of the sensitized sheet therein.

3. Automatic photographic apparatus as claimed in claim 1 including exposure flash apparatus and means operated by said shutter operating mechanism to operate said flash apparatus when said shutter operating mechanism has opened a shutter.

4. Automatic photographic apparatus as claimed in claim 2 wherein said selector and traversing means includes selector mechanism whereby when said camera having four objectives is moved into said exposure position said shutter operating mechanism can be caused selectively either to open the shutters associated with said four objectives substantially simultaneously for substantial simultaneous exposure of the four areas of the sensitized sheet in the said camera, or can be caused to operate said shutters in succession for the exposure of said four areas correspondingly in succession between said successive operation of said shutters.

5. Automatic photographic apparatus as claimed in claim 2 including an electric motor driving said traversing means and controlled by said selector means, an electric motor driving said carrier support, indexing mechanism actuated alternately to release and lock said carrier support to cause said step by step movement, at least one electric motor driving said roller feed means, first, second and third control means respectively rendering said first second and third roller feed means operative and inoperative, coin actuated means for initiating automatic operation of the photographic apparatus, a timing motor brought into operation by said traversing means when either camera reaches its operative position, and progressing mechanism operated by said timing motor and including switches closed in sequence to cause operation of the appropriate shutter operating mechanism, said control means for said roller feed means and said processing apparatus all in appropriate sequence to expose a sensitized sheet and effect its processing and delivery to a delivery point.

References Cited by the Examiner
UNITED STATES PATENTS

| | | | |
|---|---|---|---|
| 1,893,668 | 1/1933 | Diaz | 95—18 |
| 2,312,683 | 3/1943 | Zollinger | 95—36 X |
| 2,386,276 | 10/1945 | Simjian | 95—36 X |
| 2,473,174 | 6/1949 | Pifer | 95—14 |
| 2,531,376 | 11/1950 | Langdon | 95—31 |
| 3,128,685 | 4/1964 | Kitrosser | 95—18 |

JOHN M. HORAN, *Primary Examiner.*